(No Model.) 2 Sheets—Sheet 1.
R. McA. LLOYD.
MACHINE FOR MAKING STORAGE BATTERY GRIDS.
No. 510,808. Patented Dec. 12, 1893.
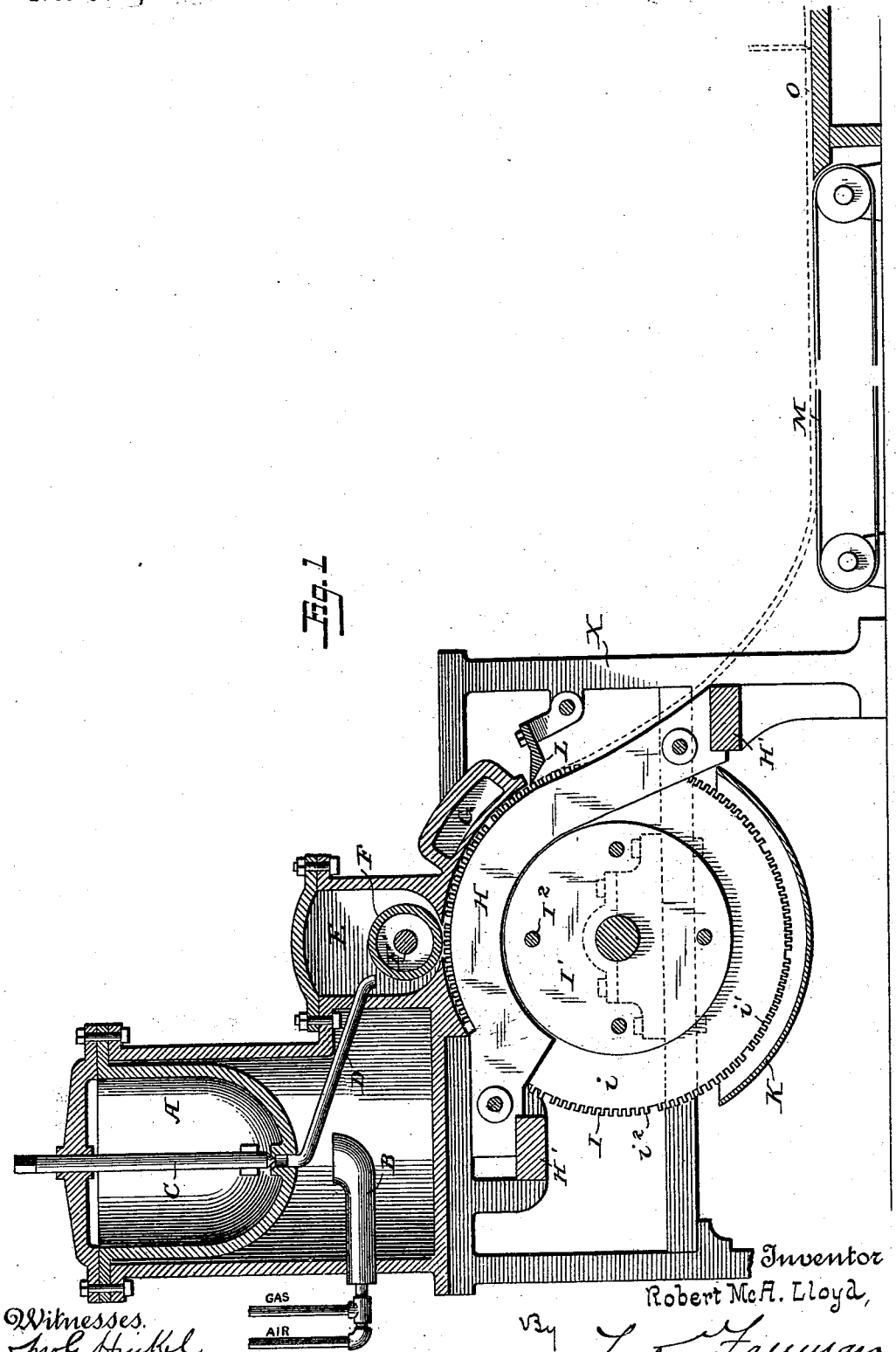

(No Model.) 2 Sheets—Sheet 2.
R. McA. LLOYD.
MACHINE FOR MAKING STORAGE BATTERY GRIDS.
No. 510,808. Patented Dec. 12, 1893.
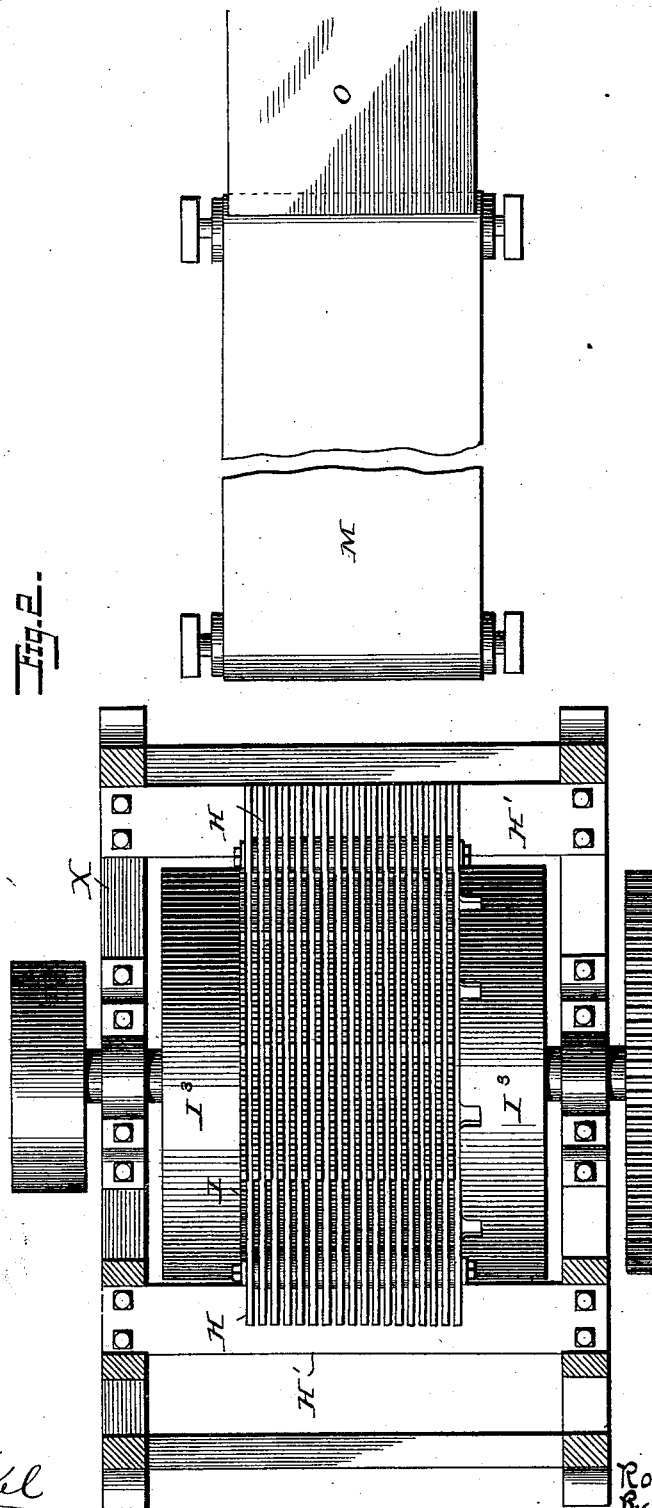
Witnesses
Jno. G. Hinkel
Alex N. Dobson
Inventor
Robert McA. Lloyd
By Foster Freeman
Attorneys

United States Patent Office.

ROBERT McA. LLOYD, OF NEW YORK, N. Y.

MACHINE FOR MAKING STORAGE-BATTERY GRIDS.

SPECIFICATION forming part of Letters Patent No. 510,808, dated December 12, 1893.

Application filed October 31, 1892. Serial No. 450,551. (No model.)

*To all whom it may concern:*

Be it known that I, ROBERT MCA. LLOYD, a citizen of the United States, residing in the city, county, and State of New York, have invented certain new and useful Improvements in Machines for Making Storage-Battery Grids, of which the following is a specification.

My invention relates to machines for making storage battery grids and it has for its object to improve and simplify the construction of such machines and to provide means whereby grids may be cheaply and rapidly made, and to these ends it consists in the various features of construction and having the mode of operation, substantially as hereinafter more particularly pointed out.

Referring to the accompanying drawings:—

Figure 1, is a vertical, longitudinal section of a machine embodying my invention. Fig. 2, is a plan view of the roller and connected mechanism.

My invention relates generally to machines for making storage battery grids and may be termed an improvement on the machine shown and described in Patent No. 460,933 to A. F. Madden, dated October 6, 1891, and one of the objects is to produce a machine capable of continuous operation in making the grids, so that not only is the machine greatly simplified in the construction, but the work is performed at a much more rapid rate, enabling me to produce grids at reduced prices and saving of time, and while I have shown my improvements as embodied in a machine having a melting pot and retort and other devices, substantially such as are shown in the patent above referred to, it will be evident to those skilled in the art that my invention may be applied to other machines varying in construction, and I do not therefore limit myself thereto, it being shown in this connection only for convenience of description.

I do not deem it necessary to describe in detail the construction of all the parts, but it is sufficient to say that A, represents a melting pot, which is heated by a suitable burner B, preferably supplied with mixed air and gas, and this melting pot is provided with a suitable valve C, controlling the flow of metal from the melting pot through the tube or passage D, and a reservoir E, and these devices are mounted upon a suitable frame X.

I have shown a reservoir E, provided with a roller F, which is mounted on a suitable shaft F', and provided with means for rotating the same, and this roller is preferably hollow and may be provided with any suitable well known means for maintaining it at a proper temperature, either by heating or cooling it. While I have shown a roller, and generally prefer to use such a roller in order to force the lead or other metal, into the molding cylinder, so as to make what is called in the art rolled grids, it will be understood that the roller may be dispensed with and the metal can be kept at a high temperature and simply run into the mold, or other means than the roller can be used for forcing the metal into the roll, as all of these features are immaterial to the main features of my invention.

In order to furnish means for making grids and the like rapidly, I provide a continuously operating mold and while this may be variously constructed and arranged, I have shown it in the form of a longitudinal cylinder having a series of circumferential grooves forming ridges or flanges between the grooves, the ridges being provided with suitable projections or teeth to make up the design of the grid, and fitting in these grooves is a series of stationary plates so arranged that they form portions of the base of the mold between the projecting ribs. This cylinder I, may be made from a solid block having the grooves $i$, cut or otherwise formed therein, leaving the flanges or ridges $i'$, having suitable projections or teeth $i^2$, extending to the outer circumference or periphery of the cylinder. Sometimes, however, I find it more convenient and practicable to make the cylinder of a series of disks, the alternating or intermediate series I', being considerably smaller in diameter than the remaining disks, which latter are provided with the teeth $i^2$, and these disks are bolted together by suitable means, as the rods or bolts $I^2$, and to secure them together, I provide the cylinder heads $I^3$, through which the bolts $I^2$, pass, and which serve to more firmly and positively confine the disks or plates in position.

Suitably mounted on the frame so as to extend into the slots or grooves between the disks or ridges of the cylinder is a series of arms or bars H, and these are shown as mounted on suitable bearings H', in the machine and as being bolted together, spacing blocks or washers being placed between their ends to maintain them in proper relation. These bars are made with a portion of their bodies curved to be concentric to the curvature of the revolving cylinder, so that when they are fitted in the slots or recesses of the cylinder, their upper curved peripheries will be slightly below the peripheries of the ridges or flanges of the cylinder and will form a portion of the base of the mold while the spaces between the teeth of the ridges or flanges form the remaining portions of the base. The end portion of these arms or bars may be so shaped that they extend beyond the periphery of the cylinder and it will be seen that in this way they act as ejectors to remove the molded strip or ribbon from the cylinder.

It will be readily understood that the spaces between the teeth of the disks as well as the spaces above the curved portion of the stationary arms or bars are of such a shape or configuration as is desired to give to the finished grids, and some of the spaces between the teeth are preferably wider than the others to form the lower bars or side pieces of the supporting frame of the grids, while the head I$^s$, may be provided with recesses for the lugs or binding posts of the grids. As it is preferable to mold the material for the grids in a continuous piece, for various reasons which are apparent, I preferably make comparatively wide slots in the ribs or flanges where the side frames of the grids are formed, so that a comparatively heavy bar will be made therein, which is wide enough to form the side bars of two adjacent grids and which may be cut in two by suitable mechanism for separating the grids, and thereby form a portion of the frame or border of each adjacent grid.

In order that the metal forced into the cylindrical mold may harden sufficiently for handling and discharge from the mold, I provide a chill G, which is arranged adjacent the cylinder and is provided with means for controlling its temperature in any ordinary way, and as it is desirable to discharge the grids with a smooth surface, I provide a suitable knife L, arranged on a bracket or otherwise connected to the frame of the machine, so that as the cylinder rotates the grid will be surfaced. Further in order that the grid may be properly formed and discharged from the cylinder I arrange a lubricator K, in connection with the cylinder which may be in the form of an oil bath, or otherwise, and which will keep the flanges and teeth of the mold properly lubricated.

Some suitable means must be supplied to take care of the grids as they are discharged from the mold and I have shown a belt carrier M, and onto this belt the molded grids are delivered, and as they are still somewhat plastic as they are discharged from the mold I have found that they will readily take the shape of the surface on which they are delivered and that they will flatten out of themselves while being removed by the belt carrier. It is however, preferable to have the carrier deliver the grids onto a flat table, and I have shown such a table at O, and as the molded strip is moved along it may be sheared or separated into the independent grids.

From this general description the operation of the machine will be understood and it will be seen that I am enabled to make a continuous strip or ribbon of molded metal, having any desired configuration, which can be delivered and subsequently cut into the separated grids, it being understood of course, that the relative size and configuration of the ribs or flanges and teeth thereon and the stationary arms or bars can be varied to suit the style of grid that is being manufactured.

The cylinder is properly mounted in bearings on the frame and can be readily removed and another one substituted therefor, and the stationary curved arms or bars can also be removed and others substituted for them, but in all cases the mold is made up partially of the cylinder and partially of the stationary arms or bars, the latter being of the proper shape through a portion of their length to conform to the surface of the cylinder, and preferably so extended as to perform the double function of molds and ejectors.

What I claim is—

1. A mold comprising a revoluble cylinder having recesses in its periphery and stationary arms or bars fitting said recesses and forming a portion of the molding surface of the mold, substantially as described.

2. A revoluble mold cylinder having ridges or flanges provided with teeth and having recesses between the ridges or flanges, and stationary arms or bars fitting the recesses and having a portion of their surfaces curved to form portions of the molding surface of the mold, substantially as described.

3. The combination with the revolving cylinder composed of disks having projecting teeth, and smaller disks interposed between the toothed disks, of stationary arms or bars, arranged between the toothed disks, substantially as described.

4. A mold comprising two series of revoluble disks of different diameter, heads, one of which is provided with a recess for the lug of the grid, bolts securing the disks and heads together and stationary arms or bars having curved surfaces also forming portions of the molding surface of the mold, substantially as described.

5. A mold comprising a rotary cylinder having recesses in its periphery and stationary arms or bars fitting said recesses and forming portions of the molding surface of the mold, the arms or bars being extended to act as ejectors for delivering the molded material, substantially as described.

6. In a machine for making storage battery grids, the combination with the reservoir above the cylinder, of a rotating cylinder having recesses in its periphery, and stationary arms or bars fitting said recesses and forming portions of the molding surface of the mold, the ends of the arms or bars being extended to form ejectors, substantially as described.

7. In a machine for making storage battery grids, the combination with a rotating cylinder having recesses in its periphery forming flanges or ridges and having teeth or projections on the ridges, of stationary arms fitting the recesses and having extended ends forming ejectors, a reservoir arranged above the cylinder and arms and a roller in the reservoir for forcing the material into the cylinder, substantially as described.

8. In a machine for making storage battery grids, the combination with the melting pot and reservoir above the cylinder, of a rotating cylinder and stationary arms arranged in recesses in the cylinder and forming a portion of the molding surface of the mold, a roll in the reservoir for forcing the metal into the mold, a chill and a delivery table, substantially as described.

9. In a machine for forming storage battery grids, the combination with the rotating cylinder and stationary arms, arranged in recesses in the cylinder and forming a portion of the molding surface of the mold of a lubricator arranged adjacent the cylinder, substantially as described.

10. In a machine for making storage battery grids, the combination with the reservoir of a rotating cylinder having recesses, stationary arms in the recesses having extensions acting as ejectors, means for lubricating the cylinder, a chill arranged adjacent the cylinder, a knife for surfacing the molded strip, a delivery table for the reception of the continuous strip and means for severing the strip into grids, substantially as described.

In testimony whereof I have signed my name to this specification in the presence of two subscribing witnesses.

ROBERT McA. LLOYD.

Witnesses:
W. W. GRISCAN,
JOHN RODGERS.